United States Patent
Hirasawa et al.

(10) Patent No.: US 10,618,410 B2
(45) Date of Patent: Apr. 14, 2020

(54) MOTOR VEHICLE

(71) Applicants: TOYOTA JIDOSHA KABUSHIKI KAISHA, Toyota-shi, Aichi-ken (JP); DENSO CORPORATION, Kariya, Aichi-pref. (JP)

(72) Inventors: Takahiko Hirasawa, Toyota (JP); Junmin Cao, Kariya (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 0 days.

(21) Appl. No.: 15/869,619

(22) Filed: Jan. 12, 2018

(65) Prior Publication Data

US 2018/0201137 A1   Jul. 19, 2018

(30) Foreign Application Priority Data

Jan. 16, 2017 (JP) .................................... 2017-4990

(51) Int. Cl.
*H02P 6/00* (2016.01)
*B60L 3/00* (2019.01)
(Continued)

(52) U.S. Cl.
CPC .............. *B60L 3/003* (2013.01); *B60K 6/445* (2013.01); *B60L 15/007* (2013.01); *B60W 20/50* (2013.01);
(Continued)

(58) Field of Classification Search
CPC .. B60L 3/003; B60L 2240/80; B60L 2240/14; B60L 11/08; H02P 2201/09; H02P 29/024; H02P 6/04; B60K 6/46
(Continued)

(56) References Cited

U.S. PATENT DOCUMENTS

2009/0009920 A1\* 1/2009 Yamada ................ B60L 3/0023
  361/93.1
2009/0251831 A1\* 10/2009 Shiba ...................... B60L 3/003
  361/30

(Continued)

FOREIGN PATENT DOCUMENTS

JP     2008-154439 A    7/2008
JP     2009-171769      7/2009
(Continued)

*Primary Examiner* — Julio C. Gonzalez
(74) *Attorney, Agent, or Firm* — Finnegan, Henderson, Farabow, Garrett & Dunner, LLP

(57) ABSTRACT

A motor vehicle comprises a motor configured to input and output power for driving; an inverter configured to drive the motor; a power storage device configured to transmit electric power to and from the motor; a system main relay configured to connect and disconnect the power storage device with and from a power line on an inverter-side; and a control device configured to enable the motor vehicle to be driven with turning on the system main relay according to a predetermined procedure in response to a system on-operation. The motor vehicle does not perform failure diagnosis of the inverter when an abnormality signal of the inverter is generated before a predetermined time after the system main relay is turned on in response to the system on-operation, while performing the failure diagnosis when the abnormality signal of the inverter is generated after the predetermined time.

8 Claims, 5 Drawing Sheets

(51) Int. Cl.
*H02P 27/08* (2006.01)
*H02P 29/024* (2016.01)
*B60L 15/00* (2006.01)
*B60W 20/50* (2016.01)
*B60K 6/445* (2007.10)
*H02P 6/04* (2016.01)
*H02P 6/12* (2006.01)
*B60L 50/61* (2019.01)
*B60L 50/13* (2019.01)
*B60K 6/46* (2007.10)

(52) U.S. Cl.
CPC ............... *H02P 6/04* (2013.01); *H02P 6/12* (2013.01); *H02P 27/08* (2013.01); *H02P 29/0241* (2016.02); *B60K 6/46* (2013.01); *B60L 50/13* (2019.02); *B60L 50/61* (2019.02); *B60L 2210/10* (2013.01); *B60L 2210/14* (2013.01); *B60L 2210/40* (2013.01); *B60L 2220/42* (2013.01); *B60L 2240/52* (2013.01); *B60L 2240/80* (2013.01); *H02P 2201/09* (2013.01); *Y02T 10/7258* (2013.01); *Y10S 903/903* (2013.01)

(58) Field of Classification Search
USPC ............................................. 290/40 C, 40 B
See application file for complete search history.

(56) References Cited

U.S. PATENT DOCUMENTS

| | | | |
|---|---|---|---|
| 2010/0045104 A1* | 2/2010 | Hirasawa | B60K 6/445 307/9.1 |
| 2010/0296204 A1 | 11/2010 | Ichikawa et al. | |
| 2011/0039173 A1* | 2/2011 | Kanazu | C01B 3/384 429/423 |
| 2014/0117899 A1 | 5/2014 | Tasaka et al. | |
| 2014/0217812 A1* | 8/2014 | Sugiyama | H02J 7/0054 307/9.1 |
| 2014/0246999 A1* | 9/2014 | Kezobo | B62D 5/0484 318/400.23 |
| 2015/0217660 A1* | 8/2015 | Manabe | H02M 7/44 307/23 |
| 2016/0142000 A1* | 5/2016 | Oba | B60L 11/12 318/400.04 |

FOREIGN PATENT DOCUMENTS

| | | | |
|---|---|---|---|
| JP | 2010-68689 | | 3/2010 |
| JP | 2010119268 A | * | 5/2010 |
| JP | 2013-017310 A | | 1/2013 |

* cited by examiner

MOTOR VEHICLE

This application claims priority to Japanese Patent Application No. 2017-4990 filed Jan. 16, 2017, the contents of which is incorporated herein by reference

TECHNICAL FIELD

The present disclosure relates to a motor vehicle and more specifically to a motor vehicle equipped with an inverter configured to drive a motor that inputs and outputs power for driving.

BACKGROUND

A proposed motor vehicle includes an engine, two motor generators and two inverters provided to drive the two motor generators, and is configured to determine whether any of switching elements included in the inverters has a failure (as described in, for example, JP 2010-68689A). A motor control device determines whether a short circuit failure of an upper arm or a lower arm occurs in any one phase of multi-phase arms and performs multi-phase simultaneous on-control that simultaneously turns on the upper arm or the lower arm of the multi-phase arms, based on the result of this determination.

CITATION LIST

Patent Literature

PTL 1: JP2010-68689

SUMMARY

In general, failure diagnosis of an inverter is performed to identify a failure of the inverter when any abnormality signal (for example, an overcurrent signal or an overvoltage signal) of the inverter is detected. The failure diagnosis of the inverter determines, for example, whether a short circuit failure occurs in any of three phases or whether an open failure occurs in any of three phases. In many cases, limitation is imposed on drive control of a motor or a generator. Immediately after a system on-operation, an abnormality signal of the inverter may be detected due to the noise or the like. Failure diagnosis performed in response to such an abnormality signal of the inverter is likely to give an inappropriate result of diagnosis since the motor vehicle is not in the stable driving state of the system.

Another proposed motor vehicle includes an inverter configured to drive a motor for driving, which is an inverter including two or more switching elements that are connected in parallel and that are simultaneously switched on and off to make a flow of large electric current, and a boost converter configured to boost electric power from a battery and supply the boosted electric power to the inverter, with a view to driving the motor with high efficiency. An abnormality signal is detected due to, for example, an overcurrent, when an open failure occurs in one of the two or more switching elements that are connected in parallel. When failure diagnosis is performed based on the abnormality signal in an engine start mode by the generator immediately after a system on-operation, limitation is imposed on drive control of the motor or the generator. This may result in failure in voltage control by the boost converter.

A motor vehicle of the present disclosure mainly aims to more appropriately perform failure diagnosis of an inverter.

In order to achieve the above main object, the motor vehicle of the present disclosure may be implemented by the following aspect.

The motor vehicle of this aspect may include a motor configured to input and output power for driving; an inverter configured to drive the motor; a power storage device configured to transmit electric power to and from the motor; a system main relay configured to connect and disconnect the power storage device with and from a power line on an inverter-side; and a control device configured to enable the motor vehicle to be driven with turning on the system main relay according to a predetermined procedure in response to a system on-operation, wherein the control device does not perform failure diagnosis of the inverter when an abnormality signal of the inverter is generated before a predetermined time after the system main relay is turned on in response to the system on-operation, while performing the failure diagnosis when the abnormality signal of the inverter is generated after the predetermined time.

The motor vehicle of this aspect enables the motor vehicle to be driven with turning on the system main relay according to the predetermined procedure in response to the system on-operation. The motor vehicle does not perform failure diagnosis of the inverter when the abnormality signal of the inverter is generated before the predetermined time after the system main relay is turned on in response to the system on-operation, while performing the failure diagnosis when the abnormality signal of the inverter is generated after the predetermined time. This configuration suppresses failure diagnosis from being performed, based on an abnormality signal due to the noise or the like. The predetermined procedure may include, for example, pre-charging a smoothing capacitor that is connected with a positive bus bar and a negative bus bar of the inverter. The predetermined time may be a time when permission is given for switching of the inverter. This is because the abnormality signal generated before permission for switching of the inverter is likely to be generated due to the noise or the like. As a result, this configuration ensures more appropriate failure diagnosis of the inverter.

DETAILED DESCRIPTION OF EMBODIMENTS

Figure 1:
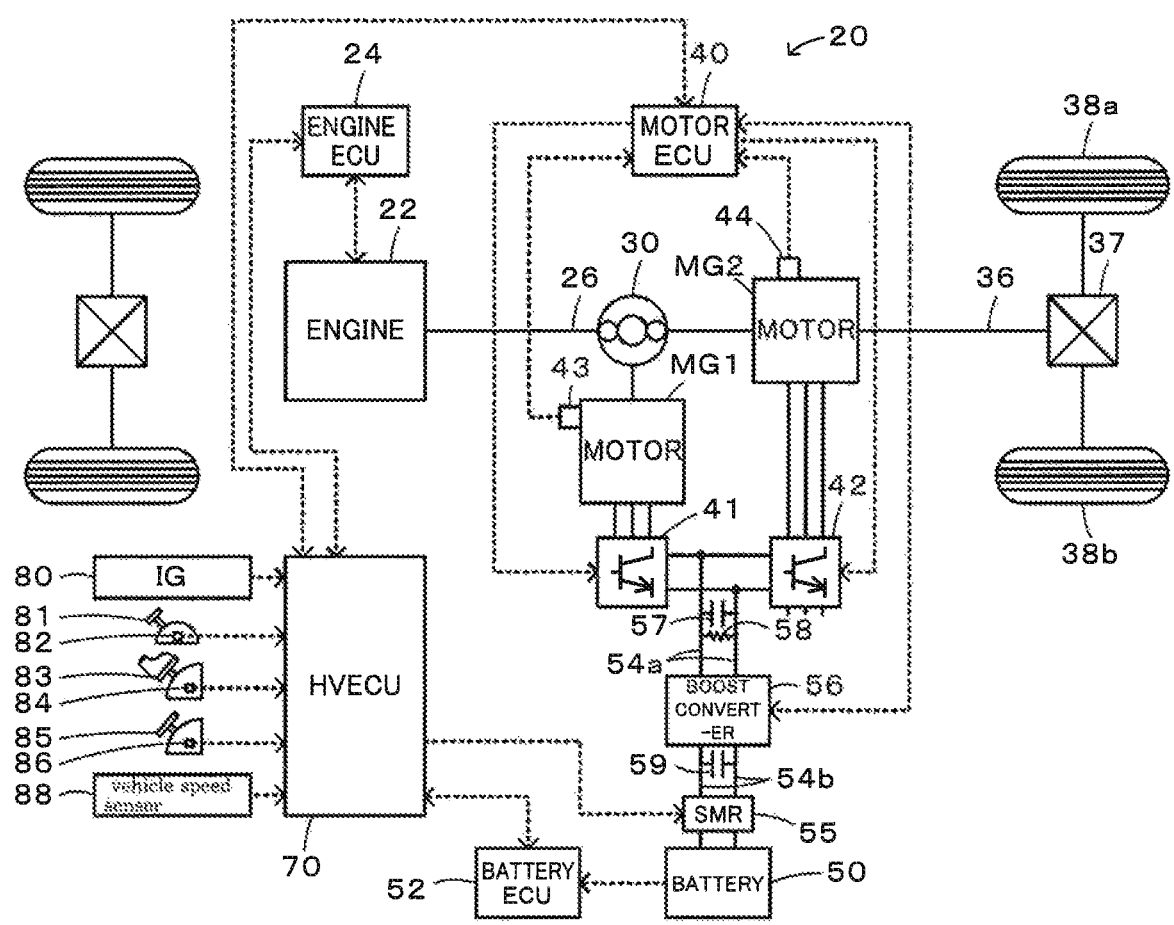
FIG. 1 is a configuration diagram illustrating the schematic configuration of a hybrid vehicle 20 according to one embodiment of the disclosure.

The following describes some aspects of the present disclosure with referring to embodiments. FIG. 1 is a configuration diagram illustrating the schematic configuration of a hybrid vehicle according to one embodiment of the disclosure. As illustrated, the hybrid vehicle 20 of the embodiment includes an engine 22, an engine electronic control unit (hereinafter referred to as engine ECU) 24, a planetary gear 30, a motor MG1, a motor MG2, inverters 41 and 42, a motor electronic control unit (hereinafter referred to as motor ECU) 40, a battery 50, a battery electronic control unit (hereinafter referred to as battery ECU) 52, a boost converter 56 and a hybrid electronic control unit (hereinafter referred to as HVECU) 70.

The engine 22 is configured as a general internal combustion engine to output power using, for example, gasoline or light oil as a fuel and is driven and controlled by the engine ECU 24. The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors configured to detect the operating conditions of the engine 22 are input into the engine ECU 24 via the input port: for example, a crank position $\theta cr$ input from a crank position sensor configured to detect the rotational position of a crank shaft 26, a cooling water temperature Twe input from a water temperature sensor configured to detect the temperature of cooling water of the engine 22, an intake air amount Qa from an air flowmeter mounted to an air intake pipe, and an intake air temperature Ta from a temperature sensor mounted to the air intake pipe. Various control signals for driving the engine 22 are output from the engine ECU 24 via the output port: for example, a driving signal to a fuel injection valve, a driving signal to a throttle motor configured to regulate the position of a throttle valve, and a control signal to an ignition coil integrated with an igniter. The engine ECU 24 makes communication with the HVECU 70 to operate and control the engine 22 in response to a control signal from the HVECU 70 and to output data regarding the operating conditions of the engine 22 to the HVECU 70 as needed basis. The engine ECU 24 calculates a rotation speed of the crankshaft 26, i.e., a rotation speed Ne of the engine 22, based on the signal input from the crank position sensor (not shown) attached to the crankshaft 26.

The planetary gear 30 is configured as a single pinion-type planetary gear mechanism. A sun gear, a ring gear, and a carrier of the planetary gear 30 are respectively connected with a rotor of the motor MG1, a driveshaft 36 which is coupled with drive wheels 39a and 39h via a differential gear 37, and the crankshaft 26 of the engine 22.

Figure 2:
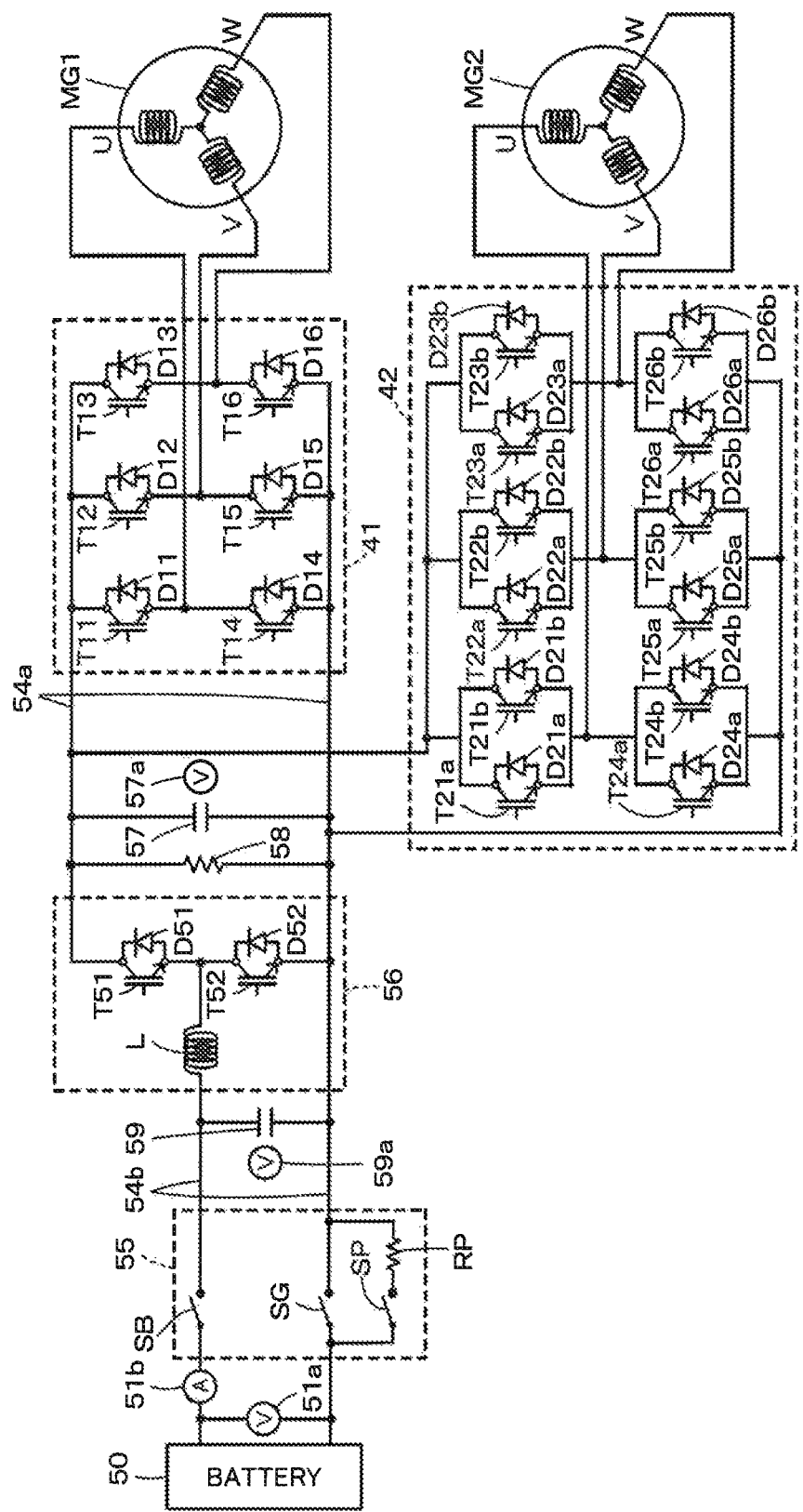
FIG. 2 is a configuration diagram illustrating the schematic configuration of an electric system including motors MG1 and MG2.

The motor MG1 is configured as a known synchronous generator motor including a rotor with permanent magnets embedded therein and a stator with three-phase coils wound thereon, and this rotor is connected with the sun gear of the planetary gear 30 as described above. The motor MG2 is also configured as a synchronous generator motor like the motor MG1 and includes a rotor that is connected with the driveshaft 36. The motor ECU 40 controls the inverters 41 and 42, so as to drive the motors MG1 and MG2. The inverters 41 and 42 are connected via power lines (hereinafter referred to driving voltage-system power lines) 54a with the boost convertor 56 that is connected with power lines (hereinafter referred to as battery voltage-system power lines) 54b which the battery 50 and a system main relay 55 are connected with. As shown in FIG. 2, the inverter 41 is comprised of six transistors T11 to T16 and six diodes D11 to D16 that are connected in parallel to and in a reverse direction to the transistors T11 to T15. The transistors T11 to T16 are arranged in pairs, such that two transistors in each pair respectively serve as a source and as a sink relative to a positive bus bar and a negative bus bar of the driving voltage-system power lines 54a. Each phase of the three-phase coils (U phase, V phase and W phase) of the motor MG1 is connected with a connection point of each pair of the transistors. Accordingly, when a voltage is applied to the inverter 41, the motor ECU 40 regulates the ratio of the ON time of the respective pairs of the transistors T11 to T16, so as to provide a rotating magnetic field in the three-phase coils and thereby rotate and drive the motor MG1. As shown in FIG. 2, the inverter 42 is comprised of six pairs of transistors T21a, T21b, T22a, T22b, T23a, T23b, T24a, T24b, T25a, T25b, T26a and T26b that are connected in parallel and twelve diodes D21a, D21b to D26a, D26b that are connected in parallel to and in a reverse direction to the transistors T21a, T21b to T26a, T26b. The six pairs of transistors T21a, T21b to T26a, T26b are arranged in series, such that two pairs of transistors respectively serve as a source and as a sink relative to the positive bus bar and the negative bus bar of the driving voltage-system power lines 54a. Each phase of the three-phase coils (U phase, V phase and W phase) of the motor MG2 is connected with a connection point of the two pairs of the transistors. Accordingly, when a voltage is applied to the inverter 42, the motor ECU 40 regulates the ratio of the ON time of the respective pairs of the transistors on the source side (transistors T21a, T21b to T23a, T23b) and the respective pairs of the transistors on the sink side (transistors T24a, T24b to T26a, T26b), so as to provide a rotating magnetic field in the three-phase coils and thereby rotate and drive the motor MG2. Each pair of the transistors T21a and T21b, . . . , T26a and T26b are simultaneously switched on and off. The inverters 41 and 42 share the positive bus bar and the negative bus bar of the driving voltage-system power lines 54a, so that electric power generated by one of the motors MG1 and MG2 may be supplied to the other motor MG1 or MG2.

As shown in FIG. 2, the boost converter 56 is configured as a step-up converter including two transistors T51 and T52, two diodes D51 and D52 that are connected in parallel to and in a reverse direction to the transistors T51 and T52, and a reactor L. The two transistors T51 and T52 are respectively connected with the positive bus bar of the driving voltage-system power lines 54a and with the negative bus bar of the driving voltage-system power lines 54a and a negative bus bar of the battery voltage-system power lines 54b. The reactor L is connected with a connection point of the transistors T51 and T52 and with a positive bus bar of the battery voltage-system power lines 54b. Accordingly, the transistors T51 and T52 are turned on and off to step up the voltage of the electric power of the battery voltage-system power lines 54b and supply the electric power of the stepped-up voltage to the driving voltage-system power lines 54a and to step down the voltage of the electric power of the driving voltage-system power lines 54a and supply the electric power of the stepped-down voltage to the battery voltage-system power lines 54b.

A smoothing capacitor 57 for smoothing and a discharge resistance 56 for discharging are arranged in parallel to each other and are connected with the driving voltage-system power lines 54a. The system main relay 55 comprised of a positive electrode-side relay SB, a negative electrode-side relay SG, a precharge relay SP and a pre-charge resistance RP is placed on an output terminal side of the battery 50 in the battery voltage-system power lines 54b. A filter capacitor 59 for smoothing is connected on the boost converter 56-side in the battery voltage-system power lines 54b.

The motor ECU 40 is configured as a CPU-based microprocessor and includes a ROM configured to store processing programs, a RAM configured to temporarily store data, input/output ports and a communication port, in addition to the CPU, although not being illustrated. Signals required for drive control of the motors MG1 and MG2 are input into the motor ECU 40 via the input port: for example, rotational positions θm1 and θm2 from rotational position detection sensors 43 and 44 configured to detect the rotational positions of the respective rotors of the motors MG1 and MG2 and phase currents that are applied to the motors MG1 and MG2 and that are detected by current sensors (not shown). The input signals into the motor ECU 40 also include a voltage VH of the smoothing capacitor 57 (i.e., voltage of the driving voltage system-power lines 54a, hereinafter referred as driving voltage system-voltage) from a voltage sensor 57a mounted between terminals of the smoothing capacitor 57 and a voltage VL of the filter capacitor 59 (i.e., voltage of the battery voltage system-power lines 54b, hereinafter referred as battery voltage system-voltage) from a voltage sensor 59a mounted between terminals of the filter capacitor 59. Control signals for driving the inverters 41 and 42 and the boost converter 56 are output from the motor ECU 40 via the output port: for example, switching control signals to the transistors T11 to T16 of the inverter 41 and the transistors T21 to T26 of the inverter 42 and switching control signals to the transistors T51 and T52 of the boost converter 56. The motor ECU 40 makes communication with the HVECU 70 to drive and control the motors MG1 and MG2 in response to control signals from the HVECU 70 and to output data regarding the operating conditions of the motors MG1 and MG2 to the HVECU 70 as needed basis. The motor ECU 40 also calculates rotation speeds Nm1 and Nm2 of the motors MG1 and MG2, based on the rotational positions θm1 and θm2 of the respective rotors of the motors MG1 and MG2 input from the rotational position detection sensors 43 and 44.

The battery 50 may be configured as, for example, a lithium ion rechargeable battery and serves to transmit electric power to and from the motors MG1 and MG2 via the inverters 41 and 42. The battery ECU 52 serving to manage the battery 50 is configured as a CPU-based microprocessor and includes a ROM configured to store processing programs, a RAM configured to temporarily store data, input/output ports and a communication port, in addition to the CPU, although not being illustrated. Signals required for management of the battery 50 are input into the battery ECU 52 via the input port: for example, a battery voltage Vb from a voltage sensor 51a mounted between terminals of the battery 50, a battery current Ib from a current sensor 51b mounted to the power line connected with an output terminal of the battery 50, and a battery temperature Tb from a temperature sensor (not shown) mounted to the battery 50. The battery ECU 52 makes communication with the HVECU 70 to send data regarding the conditions of the battery 50 to the HVECU 70 by communication as needed basis. With a view to managing the battery 50, the battery ECU 52 calculates a state of charge SOC, which denotes a ratio of the capacity of electric power dischargeable from the battery 50 to the overall capacity of the battery 50, based on an integrated value of the battery current Ib detected by the current sensor 51b, and calculates input and output limits Win and Wout, which denote maximum allowable electric powers chargeable into and dischargeable from the battery 50, based on the calculated state of charge SOC and the battery temperature Tb.

The HVECU 70 is configured as a CPU-based microprocessor and includes a ROM configured to store processing programs, a RAM configured to temporarily store data, input/output ports and a communication port, in addition to the CPU, although not being illustrated. Various signals required for drive control are input into the HVECU 70 via the input port: for example, an ignition signal from an ignition switch 80 and a vehicle speed V from a vehicle speed sensor 88. The signals input into the HVECU 70 also include, for example, a shift position SP from a shift position sensor 82 configured to detect an operating position of a shift lever 81, an accelerator position Acc from an accelerator pedal position sensor 84 configured to detect a depression amount of an accelerator pedal 83, and a brake pedal position BP from a brake pedal position sensor 86 configured to detect a depression amount of a brake pedal 85. Control signals, for example, a driving signal to the system main relay 55, are output from the HVECU 70 via the output port. The HVECU 70 is connected with the engine ECU 24, the motor ECU 40 and the battery ECU 52 via the respective communication ports as described above to transmit various control signals to and data from the engine ECU 24, the motor ECU 40 and the battery ECU 52.

The hybrid vehicle 20 of the embodiment having the above configuration may be driven in a hybrid drive (HV drive) mode or in an electric drive (EV drive) mode. The HV drive mode denotes a drive mode with operation of the engine 22, and the EV drive mode denotes a drive mode without operation of the engine 22.

Figure 3:
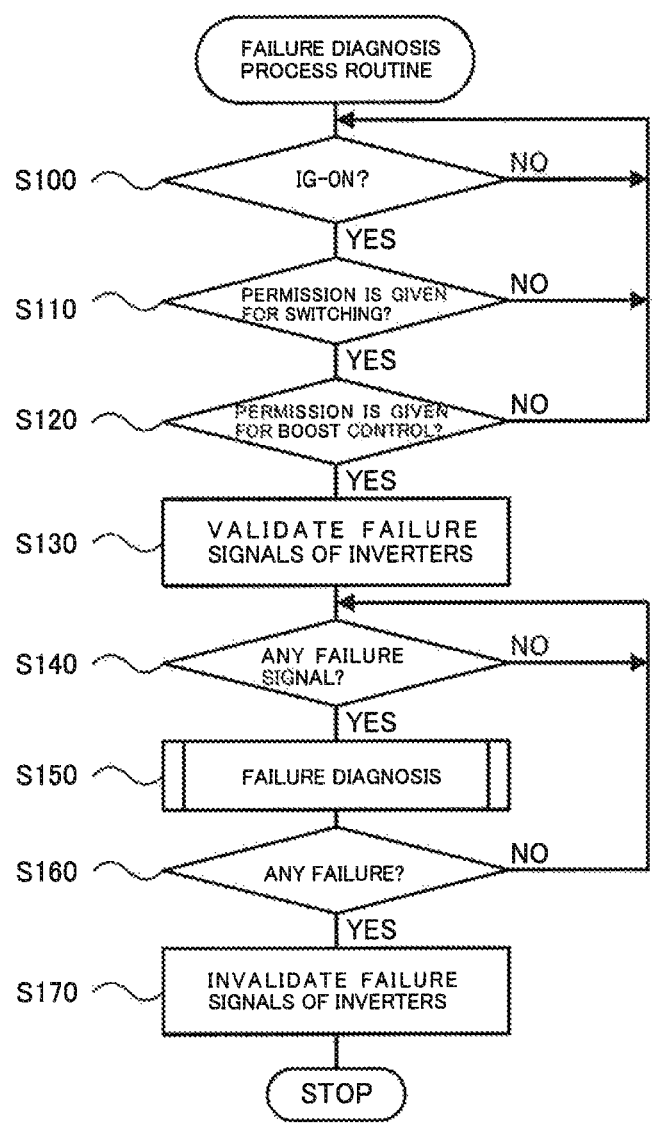
FIG. 3 is a flowchart showing one example of a failure diagnosis process routine performed by an HVECU 70.

The following describes operations of the hybrid vehicle 20 of the embodiment and more specifically a series of operations for failure diagnosis based on abnormality signals of the inverters 41 and 42. FIG. 3 is a flowchart showing one example of a failure diagnosis process routine performed by an HVECU.

When the failure diagnosis process routine is triggered, the HVECU 70 first determine whether the ignition switch 80 is switched on by an operator (step S100). When the ignition switch 80 is not switched on, the HVECU 70 waits for an on-operation of the ignition switch 80. When it is determined that the ignition switch 80 is switched on, the HVECU 70 subsequently determines whether permission is given for switching of the transistors T11 to T16 of the inverter 41 and the transistors T21a, T21b to T26a, T26b of the inverter 42 accompanied with cancellation of gate blocking of the inverters 41 and 42 (step S110). The permission for switching of the inverters 42 and 42 is given by sequentially switching on the ignition switch 80, turning on the positive electrode-side relay SB and the precharge relay SP to pre-charge the filter capacitor 59 and the smoothing capacitor 57, turning on the negative electrode-side relay SG and turning off the precharge relay SP to make the vehicle ready (drivable) and cancelling gate blocking of the inverters 41 and 42. When it is determined that no permission is given for switching of the inverters 41 and 42, the HVECU 70 returns the processing flow to step S100.

When it is determined at step S110 that permission is given for switching of the inverters 41 and 42, on the other hand, the HVECU 70 subsequently determines whether permission is given for boost control by the boost converter 56 (step S120). The permission may be given for boost control by the boost converter 56, for example, when it is determined that a current sensor (not shown) configured to detect the electric current flowing in the reactor L as well as the voltage sensors 57a and 59a are normal and that no failure occurs in the transistors T51 and T52. When it is determined that no permission is given for boost control by the boost converter 56, the HVECU 70 returns the processing flow to step S100.

When it is determined at step S120 that permission is given for boost control by the boost converter 56, on the other hand, the HVECU 70 validates failure signals (abnormality signals) that may be generated hereafter in the inverters 41 and 42 (step S130). Accordingly, detected failure signals (abnormality signals) of the inverters 41 and 42 are determined to be invalid until permission is given for switching of the inverters 41 and 42 and permission is given for boost control by the boost converter 56 after an on-operation of the ignition switch 80. This configuration effectively deals with detection of a failure signal of the inverter 41 or 42 due to the noise or the like. For example, in the case of starting the engine 22 simultaneously with making the vehicle ready, an open failure of one of the transistors T21a, T21b to T26a, T26b of the inverter 42 may cause a problem by failure diagnosis performed simultaneously with a start of the engine 22, for example, a problem of a failure in voltage control of the driving voltage-system power lines 54a by the boost converter 56 or a problem of wrong diagnosis that the inverter 41 has a failure. This configuration reduces the possibility of the occurrence of such a problem. The failure signal of the inverter 41 or 42 may be output when an overcurrent flows in any phase of the inverter 41 or 42, when an overcurrent flows in the driving voltage-system power lines 54a or when the smoothing capacitor 57 has an overvoltage.

The HVECU 70 subsequently determines whether a failure signal of the inverter 41 or 42 is detected (step S140). When no failure signal of the inverter 41 or 42 is detected, the HVECU 70 waits for detection of a failure signal. When a failure signal of the inverter 41 or 42 is detected, the HVECU 70 performs failure diagnosis of the inverters 41 and 42 (step S150). The failure diagnosis determines whether an on failure occurs and determines whether an open failure occurs in any of the transistors T11 to T16 of the inverter 41 and the transistors T21a, T21b to T26a, T26b of the inverter 42. The failure diagnosis is performed with imposing limits on torques of the motors MG1 and MG2 or imposing a limitation on switching of the inverters 41 and 42 according to the type of a failure. When no failure is detected as a result of the failure diagnosis (step S160), the HVECU 70 returns the processing flow to step S140. When a failure is detected as a result of the failure diagnosis (step S160), on the other hand, the HVECU 70 invalidates failure signals (abnormality signals) that may be generated hereafter in the inverters 41 and 42 (step S170). On the occurrence of a failure, emergency drive control is performed according to the place of the failure. Failure diagnosis hereafter is thus thought to be unnecessary.

Figure 4:
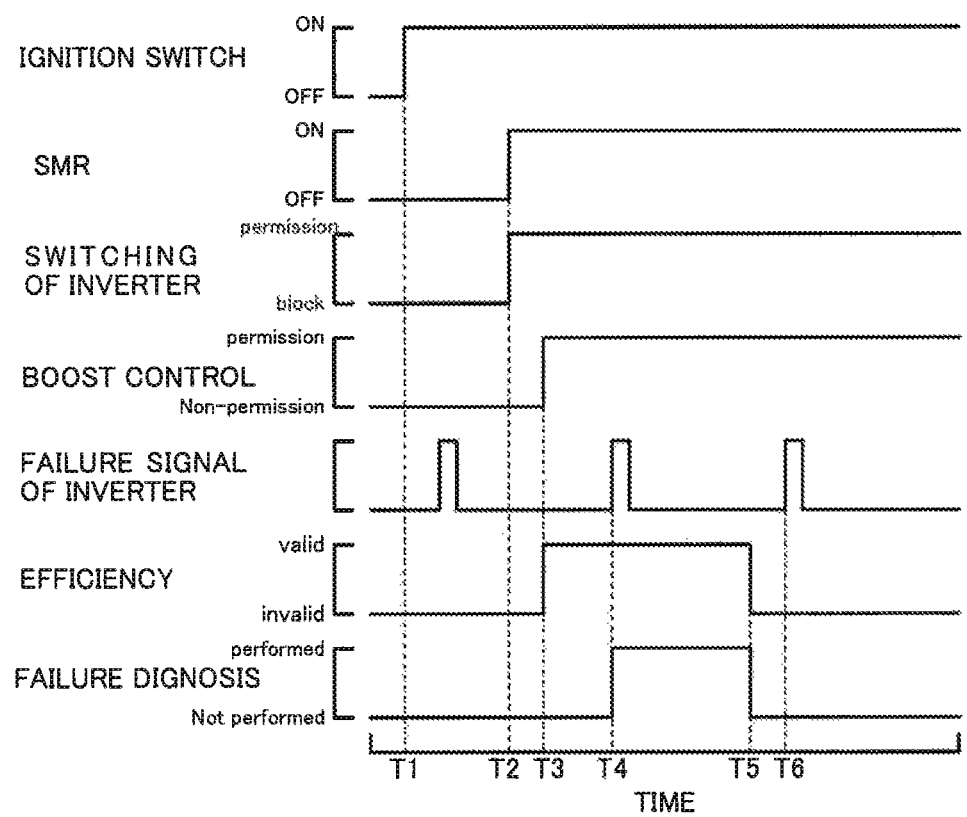
FIG. 4 is a diagram illustrating one example of time changes in switching of a system main relay 55, state of permission for switching of inverters 41 and 42, state of permission for boost control by a boost converter 56 and execution of failure diagnosis.

FIG. 4 is a diagram illustrating one example of time changes in switching of a system main relay, state of permission for switching of inverters, state of permission for boost control by a boost converter and execution of failure diagnosis. The ignition switch 80 is switched on at a time T1. At a time T2, the system main relay 55 is turned on, and permission is given for switching of the inverters 41 and 42. At a time T3, permission is given for boost control by the boost converter 56. This validates failure signals of the inverters 41 and 42 after the time T3. Accordingly, even when a failure signal of the inverter 41 or 42 is detected in a time period from the time T1 to the time T3, this detected failure signal is determined to be invalid, so that failure diagnosis is not performed. When a failure signal of the inverter 41 or 42 is detected at a time T4, failure diagnosis of the inverters 41 and 42 is performed in response to detection of this failure signal. At a time T5 on completion of the failure diagnosis, emergency drive control in response to the failure is performed, and failure signals of the inverters 41 and 42 detected after that are invalidated. Accordingly, even when a failure signal of the inverter 41 or 42 is detected at a time T6 after that, this detected failure signal is determined to be invalid, so that failure diagnosis is not performed in response to this failure signal.

As described above, the hybrid vehicle 20 of the embodiment is configured not to perform failure diagnosis of the inverters 41 and 42 even when a failure signal of the inverter 41 or 42 is detected, until permission is given for switching of the inverters 41 and 42 and permission is given for boost control by the boost converter 56 after an on-operation of the ignition switch 80. This configuration prevents failure diagnosis from being performed in response to detection of a failure signal of the inverter 41 or 42 due to the noise or the like. When a failure signal of the inverter 42 or 42 is detected after permission given for boost control by the boost converter 56, this configuration performs failure diagnosis of the inverters 41 and 42 and detects a failure of the inverter 41 or 42. As a result, this ensures more appropriate failure diagnosis of the inverters 41 and 42.

Figure 5:
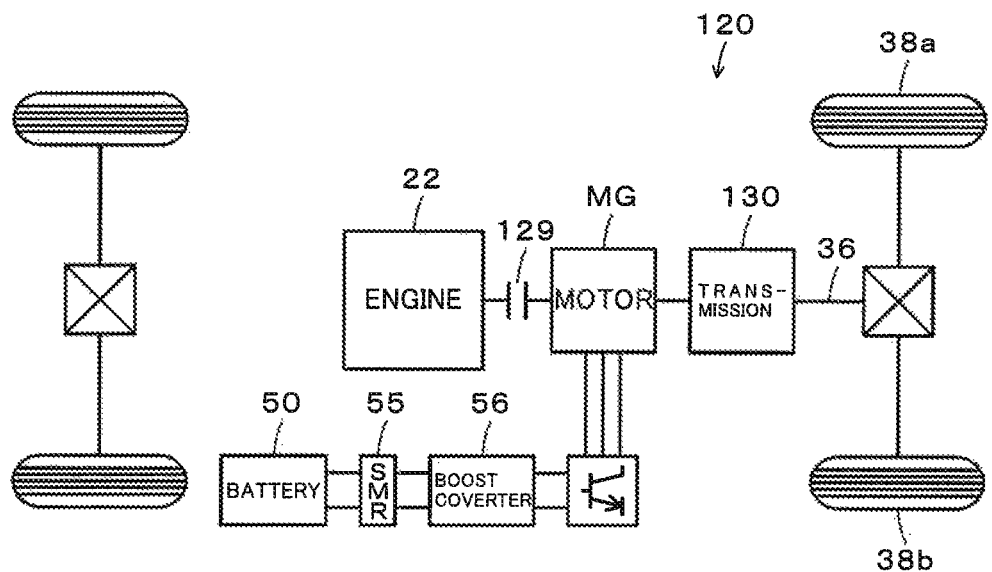
FIG. 5 is a configuration diagram illustrating the schematic configuration of a hybrid vehicle 120 according to a modification.
Figure 6:
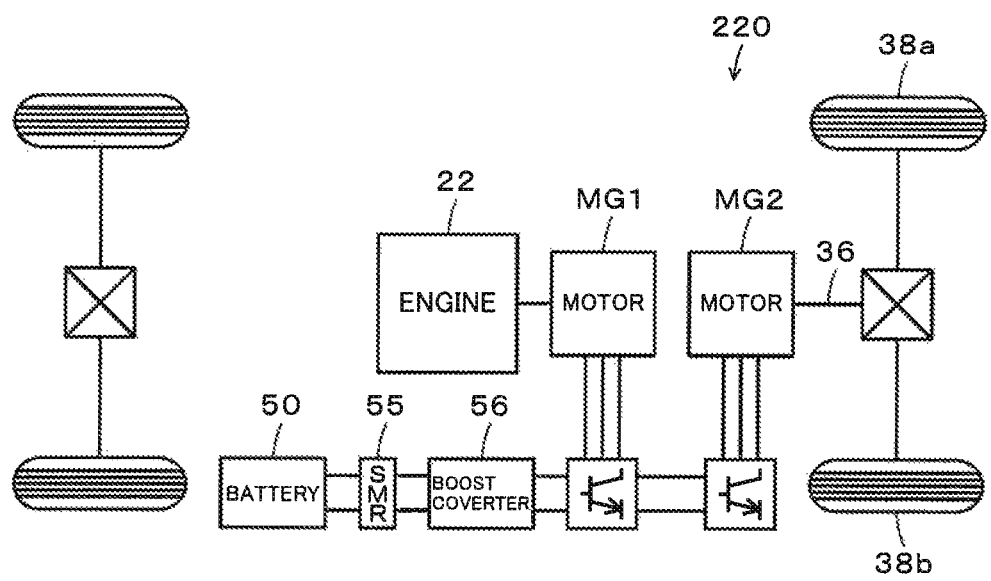
FIG. 6 is a configuration diagram illustrating the schematic configuration of a hybrid vehicle 220 according to another modification.

The hybrid vehicle 20 of the embodiment is configured such that the engine 22 and the motor MG1 are connected via the planetary gear 30 with the driveshaft 36 that is coupled with the drive wheels 38a and 38h and that the motor MG2 is connected with the driveshaft 36. As shown in FIG. 5, however, the present disclosure may be applied to a hybrid vehicle 120 of a modification configured such that a motor MG is connected with a driveshaft 36 which is coupled with drive wheels 38a and 38b, via a transmission 130 and that an engine 22 is connected with a rotating shaft of the motor MG via a clutch 129. As shown in FIG. 6, the present disclosure may also be applied to a hybrid vehicle 220 of another modification configured as a series hybrid vehicle such that a driving motor MG2 is connected with a driveshaft 36 which is coupled with drive wheels 38a and 38b and that a power generation motor MG1 is connected with an output shaft of an engine 22.

Although the hybrid vehicle 20 of the embodiment is equipped with the boost converter 56, the hybrid vehicle may not be equipped with the boost converter 56. In this modification, the processing of step S120 may be omitted from the failure diagnosis process routine of FIG. 3. In the hybrid vehicle 20 of the embodiment, the battery 50 is connected with the battery voltage-system power lines 54b. The battery 50 may, however, be replaced with a capacitor.

The above embodiment describes application of the disclosure to the hybrid vehicle 20. The present disclosure may, however, be applied Lo any configuration of a vehicle that includes a motor configured to input and output power for driving, an inverter configured to drive the motor, a power storage device configured to transmit electric power to and from the motor, a system main relay and a control device configured to enable the vehicle to be driven with turning on the system main relay according to a predetermined procedure in response to a system on-operation, for example, an electric vehicle without an engine.

In the motor vehicle of the above aspect, the motor vehicle may include a boost converter placed between the power storage device and the inverter and configured to boost electric power from the power storage device and supply the boosted electric power to the inverter, wherein the predetermined time is a time when permission is given for control of the boost converter. This is because it is unlikely to perform failure diagnosis appropriately in the case where no permission is given for control of the boost converter.

In the motor vehicle of the above aspect, the motor vehicle may include an engine; a generator configured to generate electric power using power from the engine; and an inverter for generator configured to drive the generator, wherein the inverter is an inverter for motor configured using two or more switching elements that are connected in parallel and are simultaneously switched on and off, the power storage device is configured to transmit electric power to and from the generator, and the control device does not perform failure diagnosis of the inverter for motor and the inverter for generator when an abnormality signal of the inverter for motor or the inverter for generator is generated before the predetermined time, while performing the failure diagnosis when the abnormality signal of the inverter for motor or the inverter for generator is generated after the predetermined time, wherein the failure diagnosis may include diagnosis of whether one switching element out of the two or more switching elements connected in parallel in the inverter for motor has an open failure. This configuration ensures more appropriate failure diagnosis even when one switching element in any phase of the inverter for motor has an open failure.

In the motor vehicle of the above aspect, the control device may not perform the failure diagnosis when the abnormality signal of the inverter for motor or the inverter for generator is generated after the failure diagnosis diagnoses that a failure occurs in one of the inverter for motor or the inverter for generator. Since a failure has already been identified by the failure diagnosis, there is no need to perform further failure diagnosis.

The following describes the correspondence relationship between the primary elements of the above embodiment and the primary elements of the disclosure described in Summary. The motors MG1 and MG2 of the embodiment correspond to the "motor", and the inverters 41 and 42 correspond to the "inverter". The battery 50 corresponds to the "power storage device", and the system main relay 55 corresponds to the "system main relay". The HVECU 70 among the HVECU 70, the motor ECU 40, the engine ECU 24 and the battery 52 mainly corresponds to the "control device".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The present disclosure is applicable to the manufacturing industries of motor vehicle.

The invention claimed is:

1. A motor vehicle, comprising:
a motor configured to output power for driving;
an inverter configured to drive the motor;
a power storage device configured to transmit electric power to the inverter;
a system main relay configured to connect the power storage device to a power line on an inverter-side; and
a control device configured to enable the motor vehicle to be driven when the system main relay is turned on, wherein
the control device
does not perform failure diagnosis of the inverter when an abnormality signal of the inverter is generated between a start time at which the system main relay is turned on and a predetermined time after the system main relay is turned on, the predetermined time being a time when the control device provides permission for switching of the inverter, the permission including canceling gate blocking of the inverter, and
performs the failure diagnosis when the abnormality signal of the inverter is generated after the predetermined time.

2. The motor vehicle according to claim 1, wherein the inverter is a first inverter, the motor vehicle further comprising:
an engine;
a generator configured to generate electric power using power from the engine; and
a second inverter configured to drive the generator, wherein
the second inverter includes two or more switching elements that are connected in parallel and are simultaneously switched on and off,
the power storage device is configured to transmit electric power to and from the generator, and
the control device
does not perform failure diagnosis of the first inverter and the second inverter when an abnormality signal of the first inverter or the second inverter is generated before the predetermined time, and
performs the failure diagnosis when the abnormality signal of the first inverter or the second inverter is generated after the predetermined time, wherein
the failure diagnosis includes diagnosis of whether at least one switching element out of the two or more switching elements connected in parallel in the second inverter has an open failure.

3. The motor vehicle according to claim 2, wherein
the failure diagnosis is a first failure diagnosis, and
when the control device diagnoses a failure in one of the first inverter and the second inverter during the first failure diagnosis, the control device does not perform a second failure diagnosis when the abnormality signal of the first inverter or the second inverter is generated after completion of the first failure diagnosis.

4. The motor vehicle according to claim 1, further comprising:
a boost converter placed between the power storage device and the inverter and configured to boost electric power from the power storage device and supply the boosted electric power to the inverter, wherein
at the predetermined time, the control device provides permission for control of the boost converter.

5. The motor vehicle according to claim 4, wherein the inverter is a first inverter, the motor vehicle further comprising:
an engine;
a generator configured to generate electric power using power from the engine; and
a second inverter configured to drive the generator, wherein
the second inverter includes two or more switching elements that are connected in parallel and are simultaneously switched on and off, the power storage device is configured to transmit electric power to and from the generator, and the control device does not perform failure diagnosis of the first inverter and the second inverter when an abnormality signal of the first inverter or the second inverter is generated before the predetermined time, and performs the failure diagnosis when the abnormality signal of the first inverter or the second inverter is generated after the predetermined time, wherein the failure diagnosis includes diagnosis of whether at least one switching element out of the two or more switching elements connected in parallel in the second inverter has an open failure.

6. The motor vehicle according to claim 5, wherein the failure diagnosis is a first failure diagnosis, and when the control device diagnoses a failure in one of the first inverter and the second inverter during the first failure diagnosis, the control device does not perform a second failure diagnosis when the abnormality signal of the first inverter or the second inverter is generated after completion of the first failure diagnosis.

7. The motor vehicle according to claim 1, wherein the inverter is a first inverter, the motor vehicle further comprising:

an engine;

a generator configured to generate electric power using power from the engine; and a second inverter configured to drive the generator, wherein the second inverter includes two or more switching elements that are connected in parallel and are simultaneously switched on and off, the power storage device is configured to transmit electric power to and from the generator, and the control device does not perform failure diagnosis of the first inverter and the second inverter when an abnormality signal of the first inverter or the second inverter is generated before the predetermined time, and performs the failure diagnosis when the abnormality signal of the first inverter or the second inverter is generated after the predetermined time, wherein the failure diagnosis includes diagnosis of whether at least one switching element out of the two or more switching elements connected in parallel in the second inverter has an open failure.

8. The motor vehicle according to claim 7, wherein the failure diagnosis is a first failure diagnosis, and when the control device diagnoses a failure in one of the first inverter and the second inverter during the first failure diagnosis, the control device does not perform a second failure diagnosis when the abnormality signal of the first inverter or the second inverter is generated after completion of the first failure diagnosis.

* * * * *